United States Patent [19]

Williams

[11] Patent Number: 4,606,853

[45] Date of Patent: Aug. 19, 1986

[54] FIRE RETARDANT POLYAMIDE COMPOSITIONS

[75] Inventor: Ian G. Williams, Cleveland, England

[73] Assignee: Imperial Chemical Industries PLC, London, England

[21] Appl. No.: 633,892

[22] Filed: Jul. 24, 1984

[30] Foreign Application Priority Data

Aug. 11, 1983 [GB] United Kingdom ............... 8321643

[51] Int. Cl.[4] .......................... C09D 5/18; C08K 5/34
[52] U.S. Cl. ................................ 252/609; 106/18.21; 106/18.24; 106/18.25; 106/18.32; 252/601; 524/101; 524/606
[58] Field of Search ................ 252/608, 609, 601; 8/116.1, 194, 196; 428/920, 921; 106/15.05, 18.11, 18.21, 18.24, 18.25, 18.32; 524/101, 606, 609

[56] References Cited

U.S. PATENT DOCUMENTS

| | | | |
|---|---|---|---|
| 3,562,208 | 2/1971 | Kotzsch et al. | 252/609 |
| 3,885,912 | 5/1975 | Golborn et al. | 252/608 |
| 3,895,161 | 7/1975 | Golborn et al. | 428/289 |
| 3,901,650 | 8/1975 | Golborn et al. | 252/608 |
| 3,935,162 | 1/1976 | Golborn et al. | 260/45.9 NC |
| 3,976,620 | 8/1976 | Golborn et al. | 260/45.9 NC |
| 4,298,518 | 11/1981 | Ohmura et al. | 260/32.6 NA |
| 4,321,189 | 3/1982 | Ohshita et al. | 252/609 |

FOREIGN PATENT DOCUMENTS 0001322  4/1979  European Pat. Off. .
1204835  9/1970  United Kingdom .

Primary Examiner—Stephen J. Lechert, Jr.
Assistant Examiner—Howard J. Locker
Attorney, Agent, or Firm—Cushman, Darby & Cushman

[57] ABSTRACT

A fire retardant polyamide composition comprising at least 35% by weight of polyamide having a molecular weight of at least 3000, at least 3.5% but preferably not more than 10% by weight of the condensation product of 2 moles perchlorocyclopentadiene and 1 mole of 1,5-cyclooctadiene, at least 2%, preferably at least 4% desirably not more than 10% by weight of melamine, a salt of melamine or an organic derivative of melamine and at least 0.5%, but preferably not more than 5.0% of at least one oxide selected from iron oxide and tin oxide, wherein the weight ratio of chlorinated compound to oxide is between 1:1 and 10:1 preferably between 2:1 and 6:1 and the constituents of the composition total 100%. The composition provides improved burning performance in the UL94 test in that dripping is prevented. The composition also provides acceptable burning performance at a lower concentration of total additives than when halogenated fire retardant/synergistic oxide combinations are used.

8 Claims, No Drawings

FIRE RETARDANT POLYAMIDE COMPOSITIONS

The present invention relates to fire retardant polyamide compositions.

The use of melamine or melamine derivatives, such as salts of melamine or melamine substituted at one or more of the —NH$_2$ groups with an organic radical, as a fire retardant in polyamide compositions is well known. British Pat. No. 1 204 835 discloses the use in polyamides of melamine, melam or a melamine derivative selected from compounds of the formula:

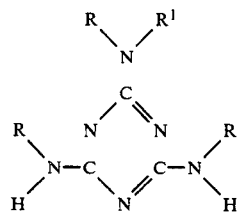

where R and R$^1$ represent hydrogen, methyl, ethyl, phenyl, toluyl or halogenophenyl. European Pat. No. 1322 discloses polyamide compositions containing the salts of melamine or melamine derivatives wherein the salt is selected from borate, sulphamate or demi-sulphate. U.S. Pat. No. 4,298,518 discloses the use of melamine cyanurate in polyamides. It has now been found that the fire retardant performance of these additives can be improved by the addition of a very specific combination of fire retardant additives. In particular compositions which exhibit freedom from dripping in burning tests can be produced.

According to the invention there is provided a fire retardant polyamide moulding composition comprising a polyamide having a molecular weight of at least 3000, at least 3.5% but preferably not more than 10%, desirably not more than 7.5% by weight of the condensation product of 2 moles perchlorocyclopentadiene and 1 mole of 1,5-cyclooctadiene, at least 2%, preferably at least 4%, desirably not more than 10% by weight of melamine, a salt of melamine or an organic derivative of melamine and at least 0.5%, but preferably not more than 5.0%, desirably not more than 3.0% of at least one oxide selected from iron oxide and tin oxide, wherein the weight ratio of chlorinated compound to oxide is between 1:1 and 10:1 preferably between 2:1 and 6:1 and the constituents of the composition total 100%.

The composition is particularly suited for use as a moulding composition.

The presence of the specified combination of chlorinated compound and oxide has a particularly beneficial effect on dripping of the composition when it is subjected to burning. Compositions according to the invention can show a complete absence of drips when subjected to, for example, the Underwriters Laboratories Standard UL94 fire retardant test procedure.

The defined combination of the chlorinated compound and the oxide has a very specific effect on the fire retardant performance which is not achieved with alternative compounds which might be considered as comparable by those skilled in the art. Thus apart from the fact that both constituents are essential to the performance of the composition the use of an alternative halogenated compound or the use of alternative synergistic oxides does not give an equivalent effect. Alternative synergistic oxides may be present provided there is also present at least 0.5% by weight of one of the specified oxides.

As well as providing the property of non-dripping the compositions of the invention have the added advantage that this is achieved at lower total concentrations of fire retardant additives and at lower cost than when a halogenated fire retardant/synergistic oxide combination is used to obtain a non-dripping burning performance.

The iron oxide may be in the form of Fe$_2$O$_3$ or Fe$_3$O$_4$, preferably the former or as a ferrite such as zinc or magnesium ferrite. The tin oxide preferably is of the formula SnO$_2$.

The condensation product of chlorocyclopentadiene and cyclooctadiene has the formula:

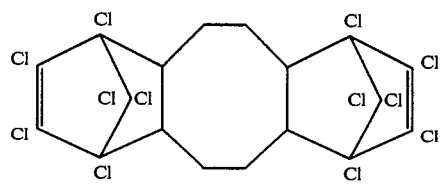

hereinafter referred to by the formula C$_{18}$H$_{12}$Cl$_{12}$.

The melamine based constituent may be melamine, melam, a salt of melamine selected from the cyanurate, sulphamate, borate or demi-sulphate, or an organic derivative of melamine of formula:

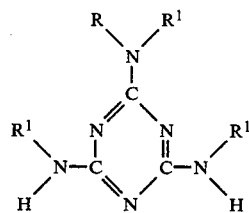

where R and R$^1$ may be the same or different and hydrogen, lower alkyl, phenyl, tolyl or halophenyl. Mixtures of melamine based constituents can be used.

The preferred polyamides for use in the invention are thermoplastic polyamides having a melting point of at least 220° C. and containing a major proportion of repeating units derived from hexamethylene adipamide, hexamethylene sebacamide or caprolactam. The most suitable polymers are homopolymers of nylon 66 and nylon 6 and copolymers of these materials containing not more than 50% by weight of units other than nylon 66 or nylon 6. These other units may be, for example, of nylon 6.9 or 6.10. The preferred materials are the homopolymers of nylon 66 and nylon 6 and copolymers of nylon 66 with nylon 6.

The polyamides preferably have a number average molecular weight of at least 3000.

The fire-retardant characteristics of the composition of the invention are conveniently determined using the Underwriters Laboratories Test Standard UL94. Using the Vertical Burning Test of this Standard the compositions of the invention should have a rating of 94 V1 or better when tested on samples having a thickness of 1.6 mm both when conditioned at a relative humidity of 50% for 48 hours or at 70° C. for one week.

In addition to the polyamide and the specified ingredients the compositions of the invention may contain any of the auxiliary materials which are known for use in polyamide compositions. These include heat and light stabilisers, pigments, lubricants and mould release agents.

The compositions of the invention are suitable for moulding general purpose electrical components or other components where fire retardancy is important.

The invention is further illustrated by reference to the following examples.

COMPARATIVE EXAMPLE A

Granules of a 97:3 copolymer of nylon 66 and nylon 6 were dry blended with 10% by weight of melamine cyanurate. The mixture was compounded in a single screw extruder at a temperature of 280° C. and the intimately mixed product was extruded as a lace, cooled in a water bath and chopped into granules. The product was dried and injection moulded into samples suitable for evaluation in the UL94 Standard and for measurement of tracking resistance. The compositions gave a rating according to the UL94 standard on the Vertical Burning Test of V0 both after conditioning at 50% Relative Humidity for 48 hours and at 70° C. for 168 hours. However, all the samples tested gave molten drips. These drips did not ignite the cotton wool used in the test and the composition is therefore classified as V0.

EXAMPLE 1

The procedure of Comparative Example A was followed except in that the composition also contained the combinations of $C_{18}H_{12}Cl_{12}$ and $Fe_2O_3$ listed in Table 1. The balance of the compositions listed in Table 1 consists of a polyamide which is a 97:3 copolymer of nylon 66 and nylon 6.

TABLE 1

| $C_{18}H_{12}Cl_{12}$ (% by wt) | $Fe_2O_3$ (% by wt) | Melamine Performance (% by wt) | Burning Rating | Dripping** (out of 5) |
|---|---|---|---|---|
| 6.0 | 1.5 | 9.2 | V0 | 0 |
| 4.0 | 1.0 | 9.5 | V0 | 1 |
| 6.0 | 0.75 | 8.6 | V0 | 0 |
| 7.5 | 2.0 | 10* | V0 | 0 |
| 3.0 | 0.75 | 10 | V0 | 5*** |

*Prepared by including 4.9% by weight melamine and 5.1% by weight cyanuric acid in the composition prior to extrusion compounding.
**Assessed on "As-moulded" samples.
***Non-burning drips.

EXAMPLE 2

The procedure of Example 1 was followed except in that there was present a mixture of synergist additives including iron oxide. The results are given in Table 2.

TABLE 2

| | | | | Burning Performance | | | | | |
|---|---|---|---|---|---|---|---|---|---|
| | | | | 50% RH/48 hours | | | 70° C./168 hours | | |
| $C_{18}H_{12}Cl_{12}$ (% by wt) | $Fe_2O_3$ (% by wt) | $Sb_2O_3$ (% by wt) | Melamine cyanurate (% by wt) | Dripping (out of 5) | Burn times (secs) max | av. | Dripping (out of 5) | Burn times (secs) max | av. | UL94 Rating |
| 3.0 | 0.75 | 0.75 | 9.5 | 2* | 6 | 1.4 | 5* | 8 | 4.3 | V2 |
| 6.0 | 1.5 | 1.5 | 9.1 | 0 | 2 | 0.8 | 0 | 3 | 1.7 | V0 |
| 6.0 | 1.5 | 1.5 + 5 zinc borate | 8.6 | 0 | 10 | 4.8 | — | — | — | V0 |
| 5.4 | 1.5 | 1.3 | 9.0 | 0 | 2 | 0.8 | 0 | 1 | 0.7 | V0 |

*burning drips.

COMPARATIVE EXAMPLE B

The procedure of Comparative Example A was followed except in that there were additionally present the halogenated compounds listed in Table 3.

TABLE 3

| | | | | Burning Performance | | |
|---|---|---|---|---|---|---|
| | | | | As moulded | | |
| Halogenated compound (% by wt) | $Fe_2O_3$ (% by wt) | $Sb_2O_3$ (% by wt) | Melamine cyanurate (% by wt) | Dripping (out of 5) | Burn times (secs) max av. | UL94 rating |
| 7.4 BPS | 1 | 0.6 | 9.7 | 5* | 18  6.9 | V2 |
| 3.2 BPS | 1 | 0.8 | 9.6 | 5* | 8  2.3 | V2 |
| 6.0 BPS | 1.5 | 1.5 | 9.1 | 5* | 12  6.3 | V2 |
| 6.0 BPS | 1.5 | 1.5 + 5 zinc borate | 8.6 | 1* | 20  6.6 | V2 |
| 6.0 BPS | 0 | 1.5 | 9.3 | 5* | 8  1.7 | V2 |
| 5.4 BPS | 1.5 | 1.4 | 8.3 | 2 | 18  6.0+ | V2 |
| 3.2 BER | 1 | 0.8 | 9.6 | 5* | 12  5.9 | V2 |
| 6.0 BER | — | 1.5 | 9.3 | 5* | 9  1.8 | V2 |
| 5.4 BER | 1.5 | 1.4 | 8.3 | 0 | 4  2.1+ | V2 |
| 6.0 BPPO | 0 | 1.5 | 9.3 | 5* | 8  1.0 | V2 |
| 5.4 BPPO | 1.5 | 1.4 | 8.3 | 1 | 8  3.3+ | V2 |

TABLE 3-continued

| Halogenated compound (% by wt) | Fe₂O₃ (% by wt) | Sb₂O₃ (% by wt) | Melamine cyanurate (% by wt) | Burning Performance As moulded | | | UL94 rating |
|---|---|---|---|---|---|---|---|
| | | | | Dripping (out of 5) | Burn times (secs) max | av. | |
| 6.0 Dec | 0 | 1.5 | 9.3 | 5* | 0 | 0 | V2 |
| 6.0 Dec | 0 | 3.0 zinc oxide | 9.1 | 3* | 56 | 32.9 | fail V2 |
| 6.0 Dec | 0 | 6.0 zinc borate | 8.8 | 5* | 42 | 12.5 | fail V2 |

BPS is brominated polystyrene.
BER is brominate epoxy resin.
BPPO is brominated polyphenylene oxide.
Dec is $C_{18}H_{12}Cl_{12}$.
*burning drips.
+50% RH/48 hours.

EXAMPLE 3

The compositions listed in Table 4 were prepared by the compounding procedure of Comparative Example A. The results show that melamine cyanurate can be replaced by melamine or melamine sulphate.

TABLE 4

| $C_{18}H_{12}Cl_{12}$ (% by wt) | Fe₂O₃ (% by wt) | Sb₂O₃ (% by wt) | (% by wt) | Burning Performance | | | | | | UL94 Rating |
|---|---|---|---|---|---|---|---|---|---|---|
| | | | | 50% RH/48 hours | | | 70° C./168 hours | | | |
| | | | | Dripping (out of 5) | Burn times (secs) max | av. | Dripping (out of 5) | Burn times (secs) max | av. | |
| 5.4 | 1.5 | 1.3 | 9.0 melamine | 0 | 1 | 0.3 | 0 | 5 | 1.2 | V0 |
| 5.4 | 1.5 | 1.3 | 9.0 melamine cyanurate | 0 | 2 | 0.8 | 0 | 1 | 0.7 | V0 |
| 5.4 | 1.5 | 1.3 | 9.0 melamine sulphate | 0 | 3 | 1.4 | 0 | 3 | 1.3 | V0 |

COMPARATIVE EXAMPLE C

Compositions identical to those of Example 3 were prepared except in that the iron oxide was omitted from the compositions.

TABLE 5

| $C_{18}H_{12}Cl_{12}$ (% by wt) | Sb₂O₃ (% by wt) | (% by wt) | Burning Performance As moulded | | | UL94 rating |
|---|---|---|---|---|---|---|
| | | | Dripping (out of 5) | Burn times (secs) max | av. | |
| 6.0 | 1.5 | 9.0 melamine | 5* | 0 | 0 | V2 |
| 6.0 | 1.5 | 9.0 melamine cyanurate | 5* | 0 | 0 | V2 |
| 6.0 | 1.5 | 9.0 melamine sulphate | 5* | 0 | 0 | V2 |

*burning drips.

EXAMPLE 4

The compositions listed in Table 5 were prepared according to the compounding procedure of comparative Example A. The results show that zinc ferrite and tin oxide are effective synergists.

TABLE 6

| $C_{18}H_{12}Cl_{12}$ (% by wt) | Synergist (% by wt) | Melamine Cyanurate (% by wt) | Burning Performance As moulded | | | UL94 rating |
|---|---|---|---|---|---|---|
| | | | Dripping (out of 5) | Burn times (secs) max | av. | |
| 5 | 2 Zinc Ferrite | 5 | 0 | 11 | 5.6 | V0 |
| 5 | 2 Zinc Ferrite | 7.5 | 0 | 7 | 3.4 | V0 |
| 7.5 | 3 Zinc Ferrite | 5 | 0 | 8 | 2.9 | V0 |
| 20.0 | 8 Zinc Ferrite | 0 | 0 | 2 | 0.7 | V0 |
| 10.0 | 4 SnO₂ | 2.5 | 0 | 5 | 2.9 | V0 |
| 20.0 | 8 SnO₂ | 0 | 0 | 4 | 1.8 | V0 |

I claim:

1. A fire retardant polyamide composition consisting of a polyamide having a molecular weight of at least 3000, at least 3.5% by weight of the condensation product of 2 moles perchlorocyclopentadiene and 1 mole of 1,5-cyclooctadiene, at least 2% by weight of melamine, a salt of melamine or an organic derivative of melamine and at least 0.5% by weight of at least one oxide selected from iron oxide and tin oxide, wherein the weight ratio of chlorinated compound to oxide is between 1:1 and 10:1 preferably between 2:1 and 6:1 and the constituents of the composition total 100%.

2. A fire retardant polyamide composition according to claim 1 containing not more than 5.0% by weight of the oxide.

3. A fire retardant polyamide composition according to claim 2 containing not more than 3.0% by weight of the oxide.

4. A fire retardant polyamide composition according to claim 1 containing not more than 10% by weight of melamine or the specified derivates of melamine.

5. A fire retardant polyamide composition according to claim 1 wherein the concentration of the condensation product is not greater than 10% by weight.

6. A fire retardant polyamide composition according to claim 5 wherein the concentration of condensation product is not greater than 7.5% by weight.

7. A fire retardant polyamide composition according to claim 1 wherein the melamine compound is selected from melamine, melamine cyanurate or melamine demi-sulphate.

8. A fire retardant polyamide composition according to claim 1 wherein the oxide is an iron oxide in the form of $Fe_2O_3$, $Fe_3O_4$, zinc ferrite or magnesium ferrite.

* * * * *